UNITED STATES PATENT OFFICE.

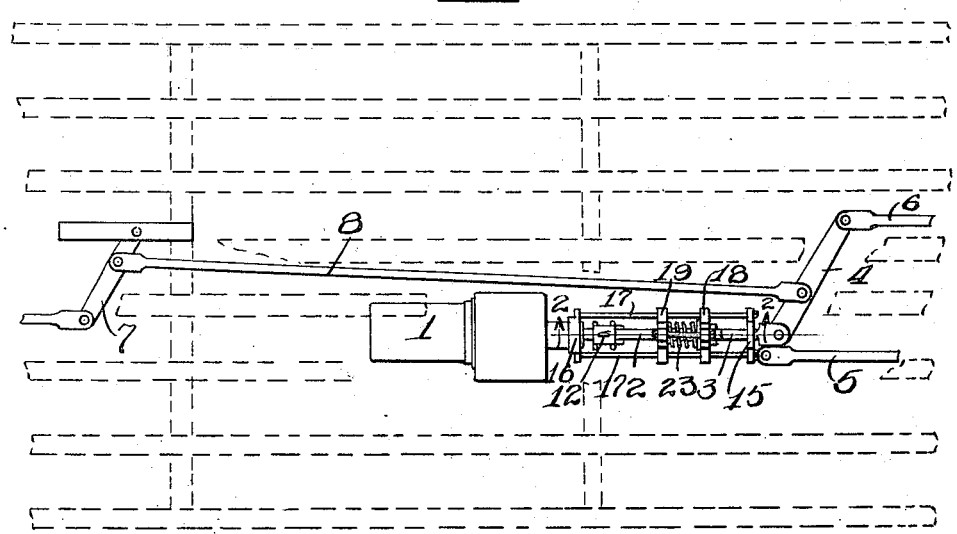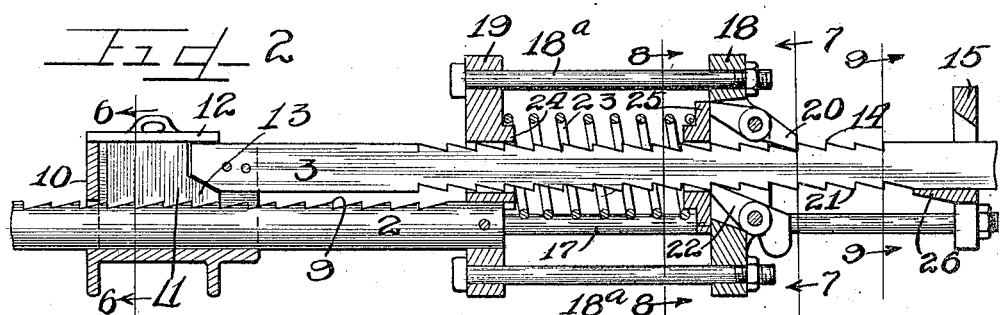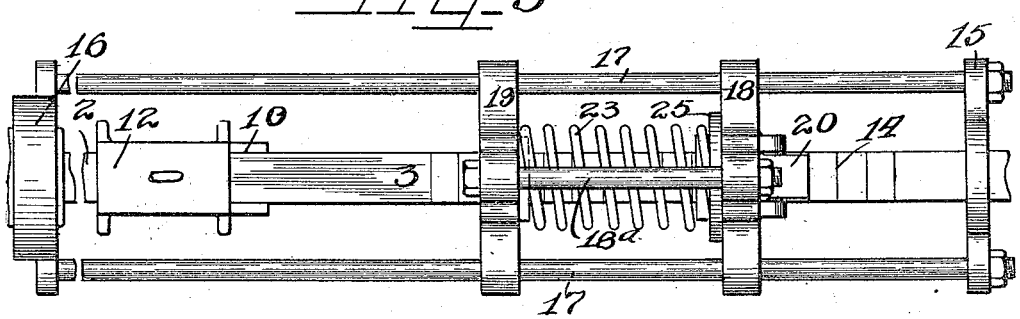

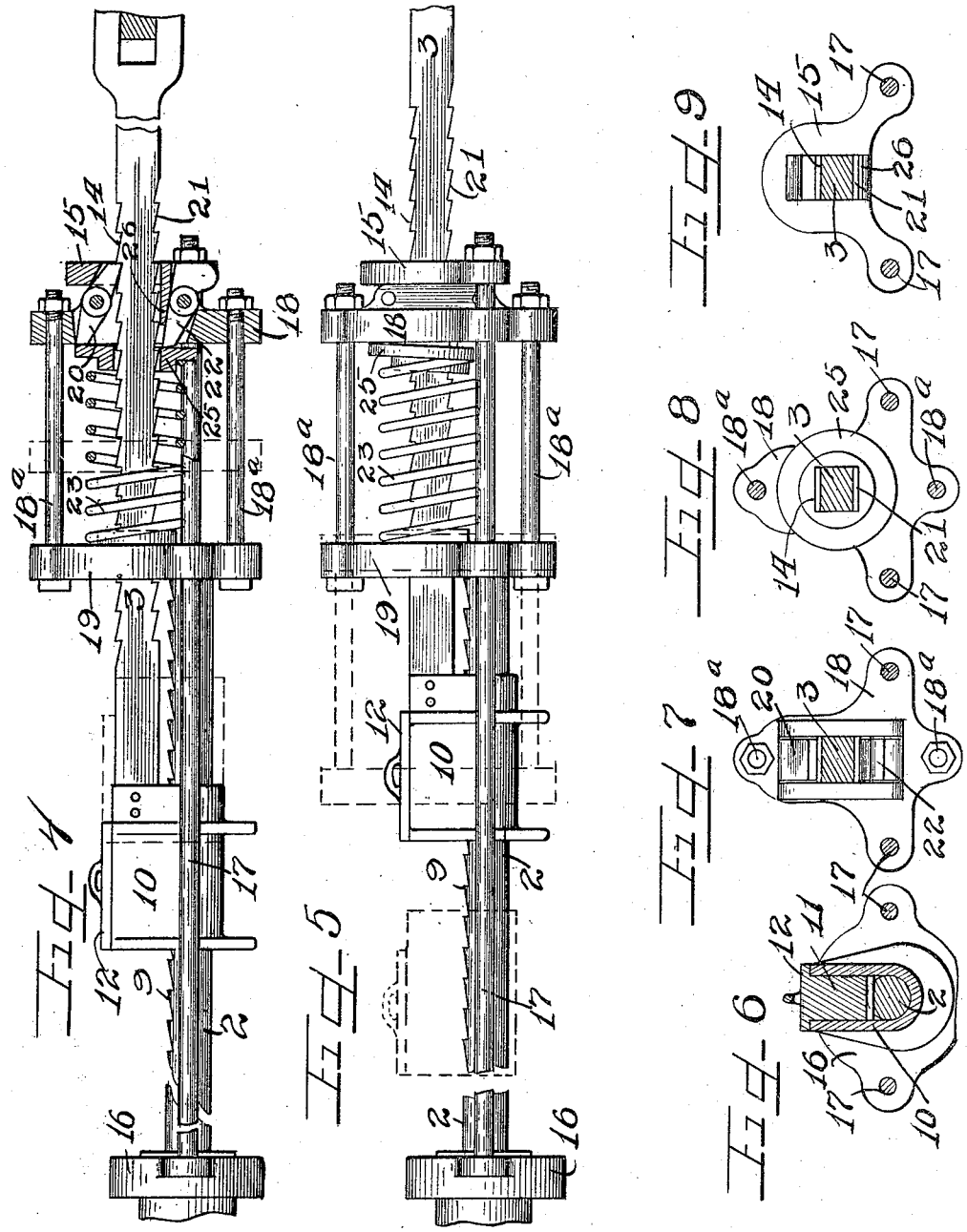

OLIVER P. WILHELM, OF MICHIGAN CITY, INDIANA, ASSIGNOR OF TWENTY-FIVE ONE-HUNDREDTHS TO SANTFORD S. WILHELM AND SEVENTEEN AND ONE-HALF ONE-HUNDREDTHS TO LANE WILHELM, BOTH OF MICHIGAN CITY, INDIANA, AND TWENTY-FIVE ONE-HUNDREDTHS TO BEN LOEWENTHAL, OF CHICAGO, ILLINOIS.

SLACK-ADJUSTER.

1,204,526.　　　　　Specification of Letters Patent.　　Patented Nov. 14, 1916.

Application filed September 24, 1914. Serial No. 863,287.

*To all whom it may concern:*

Be it known that I, OLIVER P. WILHELM, a citizen of the United States, and a resident of Michigan City, in the county of Laporte and State of Indiana, have invented certain new and useful Improvements in Slack-Adjusters; and I do hereby declare that the following is a full, clear, and exact description of the same, reference being had to the accompanying drawings, and to the numerals of reference marked thereon, which form a part of this specification.

The wearing down of brake shoes upon a car wheel often causes an inefficient operation of the brakes, due to the increase in movement required of the parts of the brake gear. Generally the increase in movement required effects an improper braking pressure of the shoe upon the wheel, sometimes with disastrous results. It is a well known fact that the most efficient braking pressure is that at which only an impending locking of the wheel is occurring, so that the wheel is not permitted to slide upon the rail.

This invention relates to a mechanism adapted to be connected into the brake gear to compensate for wear upon the brake shoe, so that the same movement of the piston in the brake cylinder takes place at all times with the result that the brake shoes are applied upon the wheel with a predetermined pressure which is the same throughout the life of the brake shoes.

It is an object of this invention to construct a take-up or slack adjusting mechanism for a brake gear which acts to elongate automatically as necessity requires to obviate excessive movement of the parts in the application of the brakes.

It is also an important object of this invention to construct a slack adjusting mechanism provided with interlocking means for preventing accidental adjustment thereof due to jarring or other causes other than that due to an increased movement resulting from worn brake shoes.

It is also an object of this invention to construct a slack adjusting mechanism for connection in a brake gear which acts automatically to take up for wear upon the brake shoes, said mechanism provided with auxiliary interlocking means to prevent elongation or contraction of the parts, due to jarring or vibration.

It is also an important object of this invention to construct a slack adjusting mechanism for brake gears wherein a plurality of slidable members are yieldably connected together and in a manner to lock one another in various positions of adjustment, whereby the same are held in a fixed position after a change in length of the mechanism.

It is furthermore an important object of this invention to construct a compensating gear adapted to automatically increase in length to take up for wear on the brake shoes in a brake mechanism, and embodying adjustably mounted parts yieldably connected one to another.

It is finally an object of this invention to construct a simple type of compensating mechanism for brake gears easily assembled and readily installed for use with standard car equipment, and acting efficiently to perform the purpose.

The invention (in a preferred form) is illustrated in the drawings and hereinafter more fully described.

In the drawings: Figure 1 is a conventional diagrammatic view of a portion of a brake gear illustrating a device embodying the principles of my invention connected thereto. Fig. 2 is a fragmentary detail section taken on line 2—2 of Fig. 1. Fig. 3 is a fragmentary top plan view of the mechanism shown in Fig. 2. Fig. 4 is a side elevation partly in section showing the relation of the parts in one position of the adjustment, and with the operation illustrated in dotted lines. Fig. 5 is a side elevation of the parts in another position of adjustment, and with the operation illustrated in dotted lines. Fig. 6 is a detail section taken on line 6—6 of Fig. 2. Fig. 7 is a detail section taken on line 7—7 of Fig. 2. Fig. 8 is a detail section taken on line 8—8 of Fig. 2. Fig. 9 is a detail section taken on line 9—9 of Fig. 2.

As shown in the drawings: the reference numeral 1, indicates a brake cylinder, and connected to be actuated thereby is a push bar 2. Another push bar 3, is adjustably connected as hereinafter described with the push bar 2, and at its end is linked to a cylinder lever 4. Connected on one end of said cylinder lever is a hand brake rod 5, and on the other end thereof is a top rod 6. A floating lever 7, is mounted beyond the cylinder 1, near the end thereof opposite that near which said cylinder lever 4, is mounted, and connecting said respective levers 4 and 7, is a cylinder lever rod 8. One side of said push bar 2, which is of circular cross section, is provided with a series of ratchet teeth 9, and slidably mounted upon said rod is a hollow carriage 10, which is cored out to receive vertically movable therein a toothed ratchet block 11, having a cover plate 12, integral therewith for said carriage casing, and provided with a handle or eye on its upper outer surface.

The long push bar 3, is rigidly secured upon said carriage 10, said rod being of rectangular cross section, and on its upper surface provided with a series of ratchet teeth 14, which are directed oppositely to those 9, of the push bar 2. Said ratchet block 11, is provided with a wedge extension 13, over which the inclined under surface of the end of the push bar 3, is adapted to engage, thus thrusting said ratchet block downwardly into engagement with the teeth of the other push bar 2. A fixed plate or block 15, through which said push bar 3, slidably extends, is held rigidly secured to another block 16, rigidly connected on the cylinder, by a plurality of horizontal guide bars or rods 17. Slidably mounted upon said guide bars 17, are blocks or plates 18 and 19, respectively, which are also slidable upon said push bar 3, the former plate provided with a pivoted pawl 20, mounted upon a boss in a cutaway portion thereof adapted to engage the teeth 14, of said push bar 3, and the latter plate 19, being rigidly connected to said push rod 2. Another series of ratchet teeth 21, is formed on the under side of said push bar 3, directed oppositely to the teeth 14, on the upper side thereof, and a gravity acting counterweighted pawl 22, is pivoted in a cutaway portion of said plate 18, upon a boss provided for the purpose, and is adapted to engage said ratchet teeth 21. A heavy compression spring 23, is wound about said push bar 3, between said respective plates 18 and 19, and acts to hold the same normally spaced from one another. Accordingly the plate 19, is provided with a small boss 24, around which one end of said spring 23, engages, and a collar 25, slidable upon the push bar 3, rests against the surface of the plate 18 by contact with the other end of said compression spring 23. Said spring thrust collar 25, bears against the tail of the pawl 20, acting to hold the same normally into position for engagement with the teeth 14, of the push bar, and also engages the toothed end of the pawl 22, to hold the same normally engaged with the teeth 21, of said push bar.

Guide bars 18ª, are secured between said plates 18 and 19, to maintain said plates properly positioned with respect to one another and to limit the separation thereof due to the spring 23.

As clearly shown in Figs. 2 and 4, the upper portion of the stationary block 15, is recessed to permit engagement therein of the toothed end of the pawl 20, as the same moves forwardly with the push bar, and upon the under portion of said block 15, is an inclined or tapered extension 26, projecting rearwardly from said block which acts when the plate 18, is thrust toward the block, to engage therethrough, thrusting the pawl 22, out of engagement with the push bar 3, of course the pawl springing the lower portion of the collar 25, outwardly when this occurs.

The operation is as follows: The device is illustrated in normal position in Figs 2 and 3. When the mechanism is actuated by the cylinder 1, the push rod 2, moves forwardly, thus thrusting the push bar 3, along by means of the ratchet block 11, and plate 19, the latter of which is rigidly connected to the push bar 2, until the plate 18, which is moved by the plate 19, through the spring 23, contacts the fixed block or plate 15. It is assumed that when the parts are in proper adjustment that the brakes are properly applied at this point in the movement of the gear, but, however, should there be a slack which should be taken up, further movement of the bar 3, by the bar 2, causes compression of the spring 23, and movement of the bar 3, through the block 18, the pawl 20, tracking over the teeth on said rod 3. However, before such movement takes place the pawl 22, is thrown out of engagement with the teeth 21, on said push bar, due to the projection into the plate 18, of the tapered extension 26, on said plate 15, so that said pawl 22, which may be termed a safety pawl, is disengaged against the compression of the spring 23, springing the collar 25, outwardly at its lower end as said pawl moves into a release position. The movement of the push bar 3, through the plate 18, continues until the brakes have been properly applied with the requisite friction pressure, and then the push bar 2, being released by the cylinder 1, moves rearwardly under the compression of the spring 23, in this instance the ratchet block tracking over the teeth 9, until said spring 23, has expanded its full amount, permitted by the tie bolts 18ª between said plates 18 and 19, and then both said push bar 3, and said push bar 2, move rearwardly as a unit to retract the brake shoes from the car wheels. It is evident that the moment the plate 18, moves rearwardly from the fixed block 15, that the pawl 22, is released, and swings upwardly into engagement with the push rod 3. So long as the mechanism is in proper adjustment, and no slack is evident in the gear, the push bars 2 and 3, move forwardly as a unit, but in the event of slack occurring, due to wear upon the shoes, the spring 23, is compressed, and a relative movement takes place between the respective push bars and the respective ratchet mechanism to lock the bars in another position of adjustment, adding an increment to the length thereof sufficient to compensate for the difference in movement required. Said pawl 22, engaging the teeth on the under side of the push bar 3, prevents the same from sliding forwardly independently of the push bar 2, due to jarring or the vibrations of the train.

Figs. 4 and 5 show clearly the position of the parts during an adjusting movement thereof, the plate 18, having been moved against the fixed block 15, and the spring 23, compressed, the slidable block 19 and carriage 10, then assuming the position shown in dotted lines in Fig. 4. Upon release of the air in the brake cylinders, the parts are extended, due to the spring 23, and the lower push bar 2, is thrust through the carriage 10, until the new position of the carriage 10, as shown in full lines in Fig. 5, occurs, the parts then being in proper adjustment to insure no slack or excess travel in the brake gear.

I am aware that various details of construction may be varied through a wide range without departing from the principles of this invention, and I therefore do not purpose limiting the patent granted otherwise than necessitated by the prior art.

I claim as my invention:

1. In a device of the class described a plurality of push bars, ratchet teeth formed thereon, yieldable connections between said push bars, ratchet mechanism for locking said push bars in various extended positions to automatically take up slack in a brake gear, and a safety pawl engaging one of said push bars to prevent accidental movement thereof due to jarring or vibration.

2. In a device of the class described slidably connected parallel push bars, a plate secured on one of said push bars and slidable on the other thereof, another plate slidable on said latter push bar, a pawl mounted in said latter plate adapted to engage in recesses in said latter push bar to lock said block and bar together, another pawl mounted in said plate engaging other recesses in said latter push bar to prevent accidental movement thereof, a compression spring mounted between said respective plates, and mechanism connected to the latter of said push bars and engaging the other thereof adapted to lock said push bars one to another.

3. In a device of the class described a pair of push bars, ratchet mechanism mounted on one thereof to lock the same to the other push bar, other ratchet mechanisms slidably mounted on said first mentioned push bar and yieldably connected to said latter push bar also acting to lock said push bars one to another, and a pawl connected to one of said push bars and engaging the other push bar to prevent accidental relative movement between said push bars.

4. In a device of the class described a plurality of push bars, a series of ratchet teeth on each thereof, said series directed in opposite directions, a plurality of ratchet mechanisms adapted to lock said push bars one to another to automatically take up slack in a brake gear, and mechanism connected to one of said push bars adapted to engage the other to prevent accidental relative movement between said push bars.

5. In a device of the class described a plurality of push bars adapted to be extended relative one another, ratchet teeth in each thereof, a plurality of ratchet mechanisms acting to lock said push bars one to another in various adjustments after the same have been extended to take up slack in a brake gear, other ratchet mechanisms preventing accidental relative movement between said push bars, and means throwing said latter ratchet mechanism out of operation when relative movement between said push bars in taking up slack is begun.

6. In a device of the class described automatic slack adjusting mechanism embracing parallel adjustably mounted push bars, pivoted means normally locking the same one to another to prevent accidental relative movement therebetween, and spring controlled mechanism acting automatically to throw said means out of locking position to permit relative movement between said push bars during an extending operation thereof.

7. In a device of the class described adjustably connected push bars, interlocking means for each thereof, said means acting successively to lock said respective push bars in various extended positions, a pivoted element adapted to maintain said push bars locked to one another when normally out of use to prevent accidental relative movement therebetween, and means acting to throw said mechanism out of operation during a take-up movement of said push bars.

8. In a device of the class described adjustably connected push bars, ratchet mechanism secured on one acting to lock the other push bar from movement in one direction, and ratchet mechanism connected on said latter bar and acting to engage said first mentioned bar to lock the same from movement in the other direction, and safety mechanism to prevent accidental relative movement between said push bars when the same are normally at rest.

9. In an automatic slack adjusting mechanism slidably connected members, ratchet teeth thereon directed oppositely on said respective members, spring actuated means connecting one of said members to the other, latching means thereon, yieldably mounted mechanism connecting said latter member to said first mentioned member through said latching means, and other latching mechanisms normally engaging said members one to another to prevent accidental relative movement therebetween when the same are at rest, and automatically thrown out of operation when a slack adjusting movement is about to take place therebetween.

In witness whereof I have hereunto subscribed my name in the presence of two subscribing witnesses.

OLIVER P. WILHELM.

Witnesses:
CHARLES W. HILLS, Jr.,
FRANK K. HUDSON.

Copies of this patent may be obtained for five cents each, by addressing the "Commissioner of Patents, Washington, D. C."